United States Patent [19]

McCallum et al.

[11] 4,387,144
[45] Jun. 7, 1983

[54] BATTERY SEPARATOR MATERIAL

[75] Inventors: David J. M. McCallum, Kirkcaldy; Alexander R. Clifford, Glenrothes, both of Scotland

[73] Assignee: Tullis Russell & Company Limited, Glenrothes, Scotland

[21] Appl. No.: 34,911

[22] Filed: May 1, 1979

[30] Foreign Application Priority Data

May 11, 1977 [GB] United Kingdom ............... 19763/77

[51] Int. Cl.³ .................... H01M 2/16; B32B 27/20; B32B 27/28; D21F 11/00
[52] U.S. Cl. .................... 429/251; 162/138; 162/146; 162/182; 428/394; 428/395; 428/396; 428/903; 429/249; 429/250; 429/252; 429/253; 429/254; 429/255; 162/157.3
[58] Field of Search ............... 429/249, 250, 251, 252, 429/254, 255, 253; 162/138, 146, 157 R, 182; 428/394, 396, 288, 296, 903, 395; 260/42, 46

[56] References Cited

U.S. PATENT DOCUMENTS

| | | | |
|---|---|---|---|
| 2,482,062 | 9/1945 | Hanson | 428/337 |
| 2,531,504 | 11/1950 | Dillehay et al. | 429/250 |
| 2,872,497 | 2/1959 | Beckvold, Jr. et al. | 429/250 |
| 3,329,559 | 7/1967 | Corbin et al. | 162/138 |
| 3,351,495 | 11/1967 | Larsen et al. | 136/146 |
| 3,472,700 | 10/1964 | Kollman et al. | 429/250 |
| 3,524,464 | 2/1976 | Cogliano | 156/306 |
| 3,770,856 | 11/1973 | Ueki et al. | 162/157 R |
| 3,811,957 | 5/1974 | Buntin | 429/254 |
| 3,847,676 | 11/1974 | Palmer et al. | 136/148 |
| 3,870,567 | 3/1975 | Palmer et al. | 264/211 |
| 3,907,604 | 9/1975 | Prentice | 429/254 |
| 3,933,525 | 1/1976 | Palmer et al. | 429/250 |
| 3,947,537 | 3/1976 | Buntin et al. | 429/254 |
| 4,000,967 | 1/1977 | Johnson et al. | 162/157 R |
| 4,010,229 | 3/1977 | Pieska et al. | 162/157 R |
| 4,060,451 | 11/1977 | Uchiyama et al. | 162/138 |
| 4,129,629 | 12/1978 | Gordon | 260/42.45 |
| 4,133,797 | 1/1979 | Tirpak | 260/42.46 |
| 4,146,686 | 3/1979 | Jones | 429/250 |
| 4,152,317 | 5/1979 | Agouri et al. | 260/44.46 |
| 4,157,275 | 6/1979 | Hollander | 162/146 |
| 4,158,595 | 6/1979 | Rave | 428/394 |
| 4,216,281 | 8/1980 | O'Rell et al. | 429/252 |
| 4,245,013 | 1/1981 | Clegg et al. | 429/144 |
| 4,264,691 | 4/1981 | O'Rell et al. | 429/250 |
| 4,277,547 | 7/1981 | Verzwyvelt | 429/250 |
| 4,279,979 | 7/1981 | Benson et al. | 428/297 |
| 4,279,979 | 7/1981 | Benson et al. | 428/297 |
| 4,298,668 | 11/1981 | Schmidt et al. | 429/250 |

FOREIGN PATENT DOCUMENTS

| | | |
|---|---|---|
| 836678 | 6/1960 | United Kingdom . |
| 873567 | 7/1961 | United Kingdom . |
| 941461 | 11/1963 | United Kingdom . |
| 948750 | 2/1964 | United Kingdom . |
| 1087635 | 10/1967 | United Kingdom . |
| 1116762 | 6/1968 | United Kingdom . |
| 1220461 | 1/1971 | United Kingdom . |
| 1230577 | 5/1971 | United Kingdom . |
| 1315471 | 5/1973 | United Kingdom ............... 428/394 |
| 1362344 | 8/1974 | United Kingdom . |
| 1372115 | 10/1974 | United Kingdom . |
| 1386982 | 3/1975 | United Kingdom . |
| 1386983 | 3/1975 | United Kingdom . |
| 1392667 | 4/1975 | United Kingdom . |
| 1398623 | 6/1975 | United Kingdom . |
| 1412007 | 10/1975 | United Kingdom . |
| 1423967 | 2/1976 | United Kingdom . |
| 1439514 | 6/1976 | United Kingdom . |
| 1440737 | 6/1976 | United Kingdom . |
| 1443581 | 7/1976 | United Kingdom . |
| 1452807 | 10/1976 | United Kingdom . |
| 1457683 | 12/1976 | United Kingdom . |
| 1461388 | 1/1977 | United Kingdom . |
| 1461389 | 1/1977 | United Kingdom . |
| 1512997 | 6/1978 | United Kingdom . |
| 1514530 | 6/1978 | United Kingdom . |
| 1520382 | 8/1978 | United Kingdom . |
| 1523482 | 8/1978 | United Kingdom . |

OTHER PUBLICATIONS

The Japan Economic Journal, 6/24/75.

Primary Examiner—Thomas J. Herbert, Jr.
Attorney, Agent, or Firm—Murray and Whisenhunt

[57] ABSTRACT

A battery separator having a low electrical resistance after extended use is made by thermal consolidation and thermal embossing of a paper web formed from a furnish containing a synthetic pulp the fibrils of which are filled with an inorganic filler, the web incorporating a wetting agent which is preferably an organic sulphonate, and organic succinate, or a phenol ethoxylate.

1 Claim, 4 Drawing Figures

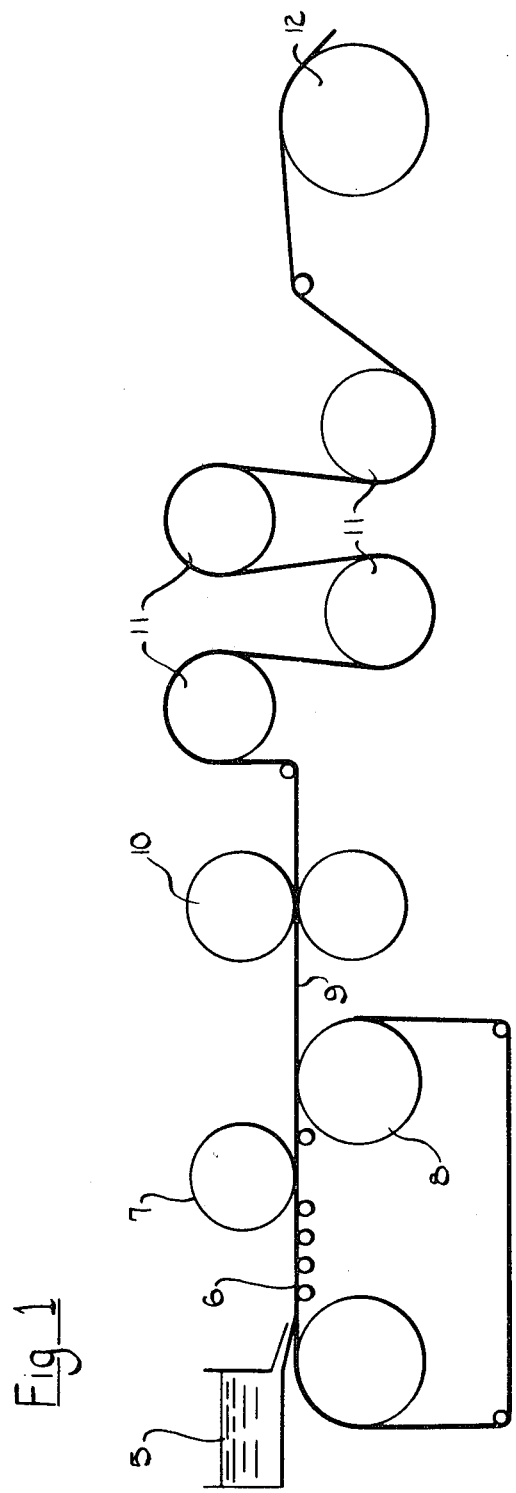

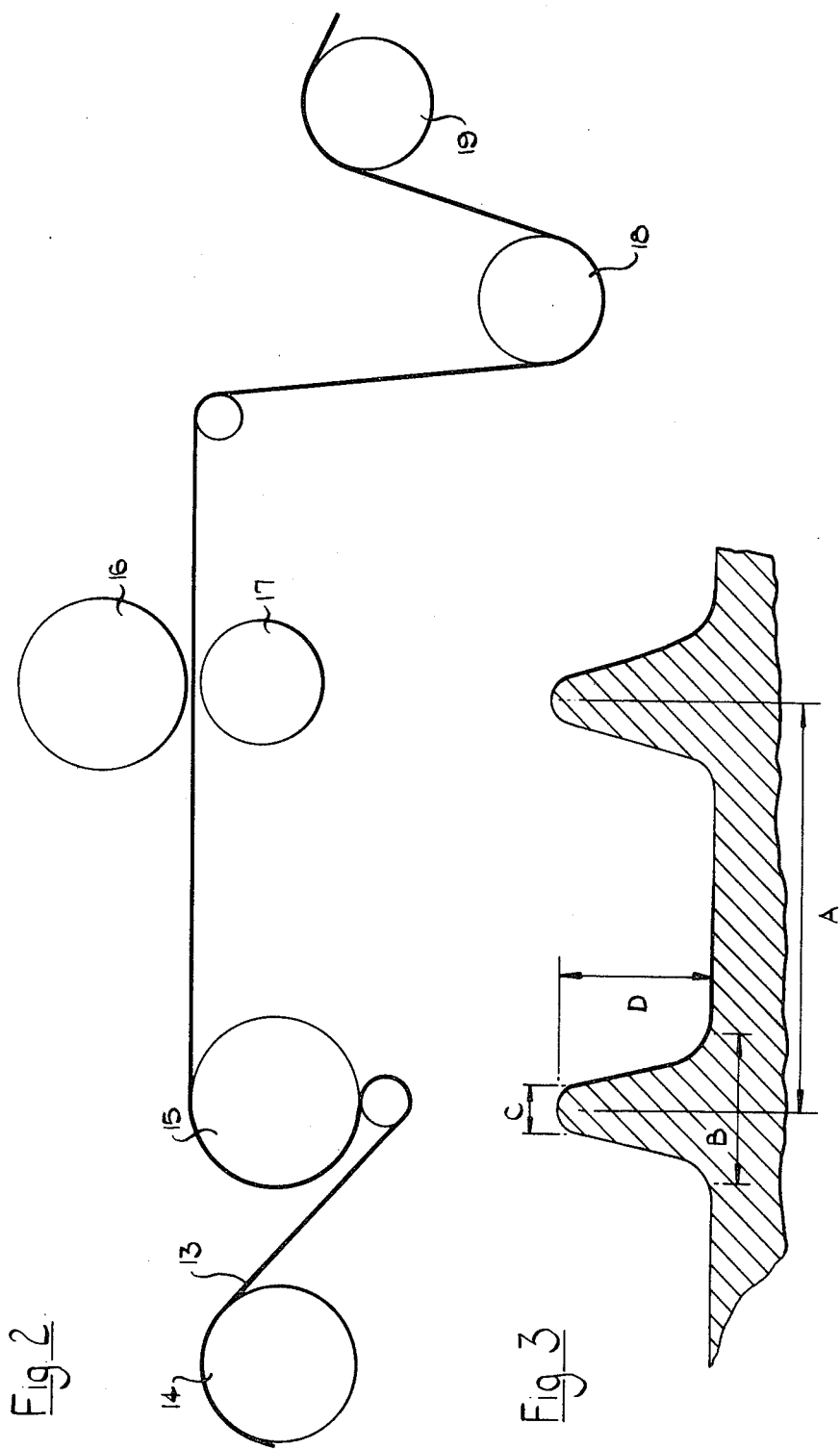

BATTERY SEPARATOR MATERIAL

Conventional battery separators, used for example in secondary lead-acid SL1 vehicle batteries, are formed by thin sheets of electrically insulating porous material which are immersed in the electrolyte between adjacent plates. Each separator has, on its face adjacent to the positive plate, a series of horizontally spaced vertical ribs which enable upward escape of the battery gases, such as nascent oxygen, which are evolved.

One form of existing separator is made of an absorbant paper impregnated with about 30% of a phenolic resin to give the paper wet strength and rigidity and to protect the cellulose from undue oxidation. The projecting ribs are formed either by deposited strips of PVC or a hot melt adhesive, or by embossing the ribs and protecting them by the application of an adhesive.

An alternative existing separator is formed by extruding a thin sheet of sintered PVC, the ribs being formed integrally during the extrusion.

The phenolic resin impregnated paper separators tend to be brittle and the impregnation step together with the application of the hot melt adhesive to produce or protect the ribs involves significant expense. The extruded separators are also significantly more expensive.

The porosity of the separators should be high, to allow the passage through the separator of ions, and thus to present a low electrical resistance, but the pores in the separators should be as small as possible to inhibit the passage through the separator of contaminants and prevent Dendritic growth. It is a further criticism of existing commercial impregnated separators that the means pore size is not as small as would be desirable.

Proposals have been made to make separators from non-woven sheets of polyolefin fibres, this having the advantage that the sheets incorporate a large thermoplastic component and can be thermally embossed to provide integral projecting ribs. However, polyolefins are hydrophobic and it has been recognised as necessary to incorporate in the polyolefins fibres, or otherwise in a separator sheet, a wetting agent which causes the separator to be wetted easily by the battery liquid. The problem still exists of maintaining good wetting out properties of the separator over extended periods of use as the wetting agents tend to leach out.

In accordance with the present invention, for use in making a battery separator, we provide a paper web which has been formed from a furnish containing a synthetic pulp the fibrils of which are filled with an inorganic filler, the web also incorporating a wetting agent.

In this context the term "synthetic pulp" has its generally accepted meaning of a pulp made up of fibrils of a polyolefin, for example by a flash spinning process. The individual fibrils may be present in various sizes and various specific surfaces, the shape and size distribution not being unlike that of refined wood pulp. Each fibril usually has a central backbone with a number of laterally projecting branch tendrils. Suitable examples of synthetic pulp would be drived from high density polyethylene, or polypropylene. Method of producing such synthetic pulps are described in G.B. Patent Specifications Nos. 1287917 and 1350487. These methods produce fibres with very large surface areas e.g. above 1 $m^2$/gram and the fibres are staple fibres 0.2 to 3 mms in length. The polyolefins may have high molecular weight e.g. in the range 40,000 to 20,000,000 especially 500,000 and above.

As compared to the previous proposal to make battery separators from non-woven sheets of extruded polyolefin fibres laid in a mat, the paper web according to the invention, being formed on a paper making machine from a furnish incorporating a significant component of synthetic pulp, has the advantage of cheapness and better homogenity. An even more important, and somewhat surprising, advantage is that the use of a pulp, the fibrils of which are filled with an inorganic filler, leads to a lower electrical resistance across the separator, particularly after extended life in a battery, which suggests that the filler acts to retain the wetting agent. It is hypothesised that the filler may be present at surface portions of the fibrils and provide active sites at which molecules of wetting agent are held on the surface of the fibrils.

Appropriate fillers will be inert in the battery environment and possible fillers are barium sulphate, a diatomaceous earth such as Perlite, a synthetic silicate, or china clay. The filler is preferably present in the synthetic pulp fibrils to an amount of at least 25% by dry weight of the synthetic pulp and a preferred upper limit is 50%. We have obtained particularly good results with a filled synthetic pulp consisting of polyethylene fibrils filled with between 40 and 50% of china clay.

Preferred wetting agents are organic sulphonates, such as Lumo 1683 (anionic) aryl alkyl sulphonate from Zschimmer and Schwarz; organic succinates, such as Warcowet 060 (anionic) sodium di-octyl sulphosuccinate from Warwick Chemicals; or phenol ethoxylates, such as Antarox CO430 nonyl phenol ethoxylate (non-ionic) of the general formula R $(CH_2CH_2O)_nH$, where n is on average 4, from GAF (UK), or Triton X45 octyl phenol ethoxylate (nonionic) of the general formula R$(CH_2CH_2O)_nH$, where n is on average 5, (more specifically polyethylene glycol mono [p-tert-octyl phenyl] ether) from Rohm & Haas. Of these the phenol ethoxylates seem to be most efficient. Other wetting agents, such as organic sulphonates with polyester groups, quaternary ammonium chloride, and ethoxylated amines and amides may be used but are believed to be of lesser interest.

A preferred level of addition of the wetting agent is up to 6%, e.g. between 1% and 6% by weight of dry synthetic pulp.

The wetting agent may be added during paper making, that is either added to the furnish or sprayed onto the paper web whilst the web is still wet. Alternatively, it may be possible for the wetting agent to be incorporated in the dry pulp during manufacture of the synthetic pulp.

One particularly useful way of adding part of the wetting agent in the furnish involves the mixing into the furnish of a porous silicate such as Perlite, pretreated with the wetting agent. The porous silicate is absorbant and acts as a carrier for the wetting agent.

By appropriate selection of the components from which the paper web according to the invention is made, particularly the inorganic filler and wetting agents, it is possible to obtain a web having an electrical resistance, after immersion in battery sulphuric acid of 1.280 sg for 20 minutes, at a level of no more than 300 m ohms $cm^2$, preferably no more than 200 m ohms $cm^2$ and for the wetting agent to be retained to such an extent that after an accelerated ageing test the electrical resistance of the web is no more than 300 m ohms $cm^2$, and preferably no more than 250 m ohms cm² in the same test comprising immersion for 20 minutes in 1.280 sg sulphuric acid before measurement of the resistance. The accelerated ageing test referred to is defined as immersing 12 cm × 10 cm sheets cut from the thermally consolidated paper web in 1.280 sg sulphuric acid at 75° C. for one hour before washing in water for 1½ hours and drying at 90° C. for 30 to 40 minutes. During the washing the sheets were separated by 1 mm and contacted by distilled water moving at 5 l/min, at a contact rate of 40 ccs of water/cm² of sheet/min.

The paper web will usually be provided, before being cut into individual separator sections with projections. These may be applied by depositing, for example strips of a hot melt adhesive on the web. However, the fibres constituting the homogeneously dispersed synthetic component of the paper web are thermoplastic and this leads to the possibility of forming ribs, dimples or other projections integrally with the paper web by a heating and pressing step. During this step the thermoplastic fibres will be softened and at least partially fused together before setting in the new configuration. Particularly when the paper is embossed with parallel ribs, as is preferred for rigid separators, these embossed ribs will provide the separator with additional strength and rigidity.

The thermoplastic nature of the paper web also leads to the possibility of providing the separators with additional strength and rigidity without brittleness, by thermally consolidating the separators substantially throughout its area. This will be achieved by subjecting the paper web to heat and pressure over substantially its whole area to consolidate the paper web, again as a result of partial fusion and resetting of the synthetic pulp fibrils. This can provide a further cost saving compared to the conventional phenolic impregnation.

Both the embossing of the paper web and the thermal consolidation are preferably simultaneously carried out. This could be done by passing the paper web through heated embossed calender rolls. Preferably however the paper web is preheated and passed between a roll having projections corresponding to those to be embossed in the web and a resilient backing roll.

An important advantage of making the paper separators from a furnish incorporating a significant quantity of synthetic pulp is that there is a lower average pore size, and narrower distribution of pore size, and a higher porosity, that is pore volume, than is present in paper sheets of equivalent weight made from wood pulp. The weight loss due to oxidation of a separator incorporating synthetic pulp is similar to that of a separator of phenolic-impregnated cellulose paper without the need for the phenolic impregnation. This is a result of the acid resistance of the synthetic pulp fibres. For the application to battery separators, the maximum pore size should be less than 50 microns with a maximum mean value of about 20 microns. However, it may be possible with a paper separator made in accordance with the invention to achieve a maximum pore size of about 25 microns with a mean value of less than 15 microns.

Ideally the porosity of the paper separator should not be less than 60%. This determines to some extend the electrical resistance, and wetting out properties of the separator. However, if the electrical resistance does not exceed a value of about 200 m.ohms cm² after soaking for 20 minutes in 1.28 sg sulphuric acid, lower porosities would be acceptable. In practice it is found that this can be achieved in a paper separator made in accordance with the invention when the porosity is between 45 and 55%. It is also possible to obtain an oxidation weight loss of no more than 25 to 35% with the new separators.

It would be anticipated that the thermal consolidation previously referred to may to some extent reduce the porosity and increase the electrical resistance of the paper web, but we have surprisingly found that if the press pressure on the paper machine and the press pressure during thermal consolidation, and also the moisture content of the paper web prior to thermal consolidation are carefully controlled, a low average pore size of about 10 microns, with a distribution of ±4 microns, and an acceptably high porosity can be achieved. Essentially this involves zero or minimum press pressures necessary for runnability on the paper machine, medium to high press pressure i.e. up to 5 psi on the thermal consolidation rolls, and a moisture content in the paper web immediately prior to the thermal consolidaton of between 2 and 3% by weight.

The furnish will usually contain at least 60%, and preferably at least 70% synthetic pulp by weight with an upper limit of 95%, or even 100%, any balance being a compatible pulp such as wood pulp. Although a paper could be made from a furnish containing a very high proportion of synthetic pulp using, for example, an Inclined Wire machine or a Rotiformer machine, it is difficult to manufacture paper webs from a furnish containing more than about 80% by weight of currently available synthetic pulp on most Fourdrinier machines. As paper making on a Fourdrinier machine is a cheaper process than on such other machines, and as a paper web made from a furnish containing between 60% and 80% by dry pulp weight of synthetic pulp is acceptable in the present context of battery separators, the paper web will preferably be made using a Fourdrinier machine.

As far as the balance of wood pulp is concerned, and as will subsequently be demonstrated, the best balance of pore structure i.e. minimum mean pore size and lowest maximum pore size with low electrical resistance and good permanency of low electrical resistance characteristics are achieved when a bleached softwood sulphate pulp at a wetness of between 42° and 47° SR is included in the furnish. The electrical resistance can further be improved by the addition of bleached hardwood sulphate pulp if some reduction in sheet strength can be tolerated.

We have found that the electrical properties of the separators are significantly improved if the furnish incorporates polyester staple fibres, preferably at a level of between 5 and 20% by dry weight of the furnish, that is pulp and polyester fibres. This is particular valuable when the pulp contains a mixture of both synthetic and wood pulp in which case the polyester fibres will effectively replace a corresponding proportion of the synthetic pulp component. Suitable polyester staple fibres will have a denier of between 1.5 and 10 and a length of between 3 and 6 mm. The inclusion of such polyester fibres has enabled us to achieve electrical resistance results in the range of from 50 and 100 m. ohms cm².

A suitable embossed paper web may have a weight of between 75 and 300, but preferably between 85 and 200, and most preferably between 140 and 180 g/m². The paper may be filled with specific absorbants for contaminants likely to be present or released within the battery with which the separator is to be used.

We find that improved wear resistance of the ultimate separator can be achieved by the inclusion of a melamine formaldehyde component. An appropriate inclusion is between 1 and 2% by weight of the total dry furnish of melamine formaldehyde (cationic resin) known as BC788 or BC789 supplied by British Industrial Plastics Limited.

The invention may be put into practice in various ways and a number of specific embodiments will be described to illustrate the invention with reference to the examples to be described.

The following experimental results have been obtained and are indicative of the important features of the invention:

COMPARISON OF DIFFERENT SYNTHETIC PULPS (Examples 1 to 8)

160 g/m$^2$ hand sheets were made containing 70% by weight of synthetic pulp pretreated with 5% by weight of the surfactant Triton X45 (wetting agent) octyl phenol ethoxylate and 0.1% by weight of hydrocarbon based defoamer Foamaster 44 from Diamond Shamrock blended with 30% by weight of an unbleached softwood sulphate pulp at 45° SR. The hand sheets which were 450 micron thick were thermally consolidated to 400 micron thickness (at 150° C. for polyethylene and 170° C. for polypropylene) before being tasted for electrical resistance after immersion for 20 minutes in 1.280 sg battery sulphric acid electrolyte both before and after accelerated ageing as previously defined. The results obtained appear in the following table:

TABLE 1

| Ex. | Synthetic (70% Sheet Component) | Electrical Resistance (m ohms cm$^2$) | |
|---|---|---|---|
| | | At 20 Mins. | After Accelerated Ageing. |
| 1. | Pulpex A (unfilled polyethylene | 1812 | 2012 |
| 2. | Turu 35 (unfilled polyethylene | 850 | too high to record |
| 3. | Turu 36 (unfilled polyethylene | 1325 | too high to record |
| 4. | SWP E940 (unfilled polyethylene | 4562 | too high to record |
| 5. | SWP R830 (unfilled polyethylene | 2437 | too high to record |
| 6. | Carifil R120C (polypropylene filled with 16% Barium Sulphate) | 160 | 260 |
| 7. | C$_2$KM (polyethylene filled with 27% China Clay) | 250 | 290 |
| 8. | C$_2$KS (polyethylene filled with 45% China Clay) | 160 | 185 |

These results clearly illustrate the value of using a filled synthetic pulp which results in greatly improved resistance values which are still far better than the unfilled materials even after the ageing test.

COMPARISON OF SURFACTANTS (Examples 9 to 15)

160 g/m$^2$ hand sheets were prepared containing 70% by weight of synthetic pulp, in this case C$_2$KS manufactured by Montedison (polyethylene filled with 45% China clay), pretreated with 4% by weight of various surfactants and 0.15% by weight of a hydrocarbon based defoamer Foamaster 44 from Diamond Shamrock before blending with 30% by weight of an unbleached softwood sulphate at 30° SR. After thermal consolidation at 150° C. from 450 to 400 micron, the maximum pore diameters and electrical resistances after 20 minutes immersion and accelerated ageing (as in the previous experiments) of the sheets were determined. The results obtained are given in the Table 2 below:

TABLE 2

| Ex. | Surfactant (4% on C$_2$KM). | Max. Pore Diameter (microns) | Electrical Resistance (m ohms cm$^2$) | |
|---|---|---|---|---|
| | | | At 20 Mins. | After Accelerated Ageing. |
| 9. | Aryl alkyl sulphonate Lumo 1683 ex Zschimmer & Schwarz | 65 ± 4 | 150 | 250 |
| 10. | Nonyl phenol ethoxylate Sunaptol NP55 ex Pechiney Ugine Kuhlmann | 63 ± 4 | 150 | 175 |
| 11. | Nonyl phenol ethoxylate Antarox C0430 ex GAF (UK) | 57 ± 4 | 165 | 190 |
| 12. | Octyl phenol ethoxylate Triton X45 ex Rohm & Haas | 61 ± 4 | 150 | 200 |
| 13. | Di-octyl sulpho succinate Humifen WT27G ex GAF (UK) | 50 ± 4 | 125 | 1125 |
| 14. | Di-octyl sulpho succinate Warcowet 060 ex Warwick Chemicals | 60 ± 4 | 125 | 2125 |
| 15. | No. Surfactant | 43 ± 4 | 2000 | too high to record |

These experimental results indicate that all surfactants increase the value obtained for the maximum pore diameter and reduce the 20 minute electrical resistance value. The di-octyl sulpho succinates supplied by GAF (UK) exhibit the best pore size value and 20 minute electrical resistance value but poorer electrical resistance after accelerated ageing. The nonyl and octyl phenol ethoxylates provide an acceptable combination of all three properties.

COMPARISON OF CELLULOSE COMPONENTS (Examples 16 to 22)

160 g/m$^2$ hand sheets thermally consolidated from 450 to 400 micron were prepared from 70% by weight of C$_2$KS synthetic pulp treated with 4% by weight of di-octyl sulpho succinate and 0.2% by weight of a hydrocarbon based defoamer Doamaster 44 from Diamond Shamrock, and 30% by weight of various cellulose wood pulps. The maximum pore diameter of the sheets, and their electrical resistance after 20 minutes immersion and after accelerated ageing were determined as before and the results are given in Table 3.

TABLE 3

| Ex. | 30% Cellulose Component | | | | | Max. Pore Diameter (microns) | Electrical Resistance (m ohms cm²) | |
|---|---|---|---|---|---|---|---|---|
| | Pulp 1 | °SR | % | Pulp 2 | °SR % | | At 20 Mins. | After Accelerated Ageing. |
| 16. | bleached softwood sulphate | 30 | 30 | Nil | | 54 ± 4 | 225 | 475 |
| 17. | bleached softwood sulphate | 45 | 30 | Nil | | 45 ± 4 | 212 | 1162 |
| 18. | unbleached softwood sulphate | 30 | 30 | Nil | | 46 ± 4 | 150 | 3150 |
| 19. | unbleached softwood sulphate | 45 | 30 | Nil | | 32 ± 4 | 160 | 4160 |
| 20. | bleached hardwood sulphate | 30 | 30 | Nil | | 81 ± 8 | 62 | 302 |
| 21. | bleached hardwood sulphate | 45 | 30 | Nil | | 75 ± 7 | 87 | 157 |
| 22. | bleached hardwood sulphate | 35 | 15 | bleached softwood sulphate | 45  15 | 50 ± 5 | 110 | 210 |

These results indicate that for minimum pore diameter, the unbleached softwood sulphate is superior to the bleached softwood sulphate which is superior to the bleached hardwood sulphate. For minimum 20 minute electrical resistance value the bleached hardwood sulphate is superior to the unbleached softwood sulphate which is superior to the bleached softwood sulphate. For minimum increase in electrical resistance on ageing the bleached hardwood is slightly superior to the bleached softwood sulphate which is substantially superior to the unbleached softwood sulphate. The best combination of properties is achieved with a blend of bleached hardwood and softwood sulphates.

It should be noted that the maximum pore diameters quoted in the above results to the last two sets of experiments appear to be inflated above values which we indicate can be obtained for our separator sheets. This is partly because the experiments were carried out on hand sheets, rather than machine produced sheets, which inevitably leads to an increase in the size of the larger pores. More significant however is that the maximum pore diameters were determined by the so-called "bubble test" which is a quicker way of determining maximum pore size than the standard determination using a mercury porosimeter. However the bubble test determines the size of the pores of maximum diameter whereas the mercury porosimeter determines the diameter size below which the diameters of 95% of the pores lie. This latter test is more meaningful in the context and determines the normally accepted maximum pore diameter of the sheet. In fact the maximum pore diameters quoted in the results in Tables 1 to 3 may be inflated by a factor of 4 or 5 compared to the values which would have been obtained from the same furnish, and had the maximum pore diameter been determined by use of a mercury porosimeter.

Some examples of the production and conversion of the paper web to ribbed separator form in accordance with the invention will now be described by reference to the accompanying drawings, in which:

BRIEF DESCRIPTION OF THE DRAWINGS

FIG. 1 is a diagram of a paper machine;
FIG. 2 is a diagram of an embossing unit;
FIG. 3 is a section of an embossing roller of the FIG. 2 unit; and,
FIG. 4 is a perspective view of a finished battery separator.

EXAMPLE 23

Figure 4:
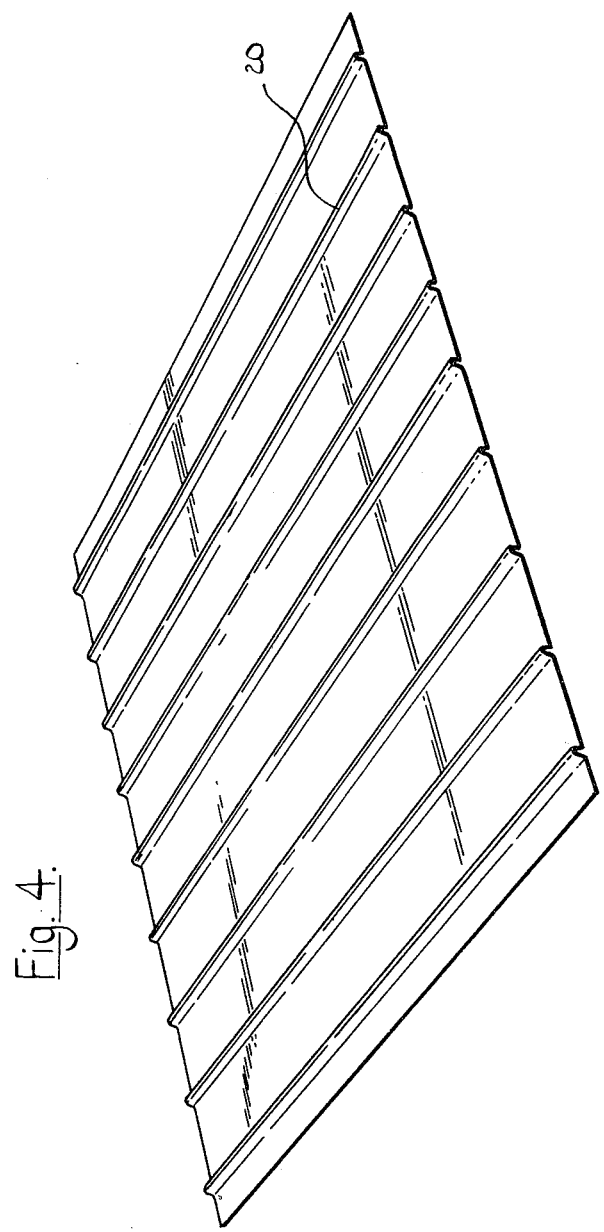

To a suspension of synthetic polyethylene pulp the fibrils of which are filled with 27% by weight of china clay, and named Ferlosa $C_2KM$ from Montedison, was added 5% by weight of dry synthetic pulp, of Lumo 1683 an aryl alkyl sulphonate surfactant from Zschimmer & Schwarz. This mixture of synthetic pulp and surfactant was then blended with softwood sulphate wood pulp in a ratio of 30 parts dry wood pulp to 70 parts dry synthetic pulp, and the mixture was beaten to 30° SR. After the blending 0.5% of aluminium sulphate per total dry weight of fibre was added for improved retention of the surfactant.

The furnish was then introduced into a flow box 5 of a Fourdrinier paper machine, from which the furnish was laid on a moving wire 6 which passed under a dandy roll 7 and around a couch roll 8 through which suction was applied. The resulting wet paper web 9 was passed through a press section 10 around drying cylinders 11, and reeled onto a reel 12, by-passing the conventional machine calender rolls.

The machine parameters were adjusted so that the wet press roll pressure at the section 10 was adjusted to a minimum operating pressure; the temperature of the machine drying cylinders 11 was maintained below 120° C.; and the production rate was adjusted to achieve a moisture content at reel up of between 2 and 3%. Immediately after paper manufacture the paper rolls were enclosed in a polythene wrapper.

The reeled base paper was then thermally consolidated and embossed by means of the unit shown in FIGS. 2 and 3. Thus the base paper web 13 was unreeled from a reel 14, still with a moisture content of between 2 and 3%, and at a speed of between 5 and 15 meters per minute passed around a heated cylinder 15 which was at a temperature of between 170° and 200° C., through the nip between a pair of embossing rolls 16 and 17, around a chilled cooling cylinder 18, and reeled onto a reel 19. The rolls 16 and 17 are a male steel embossed roll 16 and a rubber roll 17 of controlled hardness. An acceptable profile for the roll 16 is shown in FIG. 3, in which the dimension A is 15.5 mm., B is 500 microns, L is between 100 and 200 microns, and D is 1200 microns.

It will be appreciated that the thermoplastic synthetic pulp component of the paper web 13 will be softened during passage around the cylinder 15, and the thermoplastic fibrils will be partially fused together during passage through the rolls 16 and 17. These rolls compress the paper web over its full area and simultaneously emboss the web with parallel ribs in the cross web direction at 15.5 mm. centres. As the web is subsequently cooled, particularly after passage around the cylinder 18, the thermoplastic component sets in the new configuration.

The resulting embossed paper web, which has a weight of 160 g/m$^2$ is subsequently unreeled from the reel 19 and cut into individual square battery sections, of which one having ribs 20 and a square side of 15 cm. is shown in FIG. 4. It will be appreciated that the ribs 20 will have substantially the same profile as the roll 16 as shown in FIG. 3.

EXAMPLE 24

The process as described in Example 23 was modified by reducing the initial surfactant addition to the synthetic pulp from 5% to 0.3% by weight of dry synthetic pulp. However, in addition further of the surfactant was applied to a level of 1% by weight of dry synthetic pulp to the paper web by spraying or roller application at the dandy roll or at some position between the dandy roll and the drying cylinders 11. It is possible by this modification to achieve lower addition levels of surfactant to the paper than can be achieved by the more conventional wet end addition. This modification also improves the ease of papermaking by reducing the foaming tendencies of the surfactants.

EXAMPLE 25

The process as described in Example 23 was modified by replacing some of the dry synthetic pulp with 1.5 denier 6 mm. polyester staple fibres as sold by Dupont under the name Dacron. The furnish consisted of 30% wood pulp, 60% synthetic pulp, and 10% polyester fibres. This modification showed that lower electrical resistance can be obtained by the addition of polyester fibres as electrical resistance figures in the range of 75 m ohms cm$^2$ to 125 m ohms cm$^2$ were obtained.

EXAMPLE 26

The process as described in Example 23 was modified by halving the initial surfactant addition to the synthetic pulp. In addition a porous silicate sold under the name Perlite was pretreated with 50% of the surfactant mentioned in Example 23. This pretreated porous silicate was added to the total fibre blend of synthetic and wood pulp at a level of 3% by weight of the dry synthetic and wood pulp.

EXAMPLE 27

The process as described in Example 23 was modified by reducing the proportion of wood pulp in the mixture of synthetic and wood pulp from 30% to 20% and increasing the beating of the pulp from 30° SR to 55° SR. This modification allows a higher level of synthetic pulp to be used thereby giving improved oxidation resistance.

EXAMPLES 28 to 32

The process as described in Example 23 was modified by replacing the Lumo 1683 surfactant in turn by between 4 and 6% of 2272R surfactant from Diamond Shamrock; Mersolat HCA 76 surfactant from Bayer (these two being of similar chemical type to Lumo 1683); WT27 surfactant from GAF (UK) Limited; Gloquat 1032 surfactant from ABM Chemicals; and Warcowet 0.6% from Warwick Chemicals. These examples demonstrated that surfactants other than the one mentioned in Example 23 have been found to be acceptable. Similar electrical properties were obtained.

EXAMPLE 33

To a dispersion of synthetic polyethylene pulp, the fibrils of which are filled with 42% by weight of china clay, and named Ferlosa C$_2$KS from Montedison, was added 4.5%, by weight of dry synthetic pulp, of Antarox CO430, a nonyl phenol ethoxylate surfactant from GAF (UK). To a dispersion of bleached softwood sulphate pulp beaten to 45% SR was added 5%, by weight of dry wood pulp, of BC788, a melamine formaldehyde wet strength aid from British Industrial Plastics Limited. The mixture of synthetic pulp and surfactant was then blended with the mixture of wood pulp and wet strength aid in a ratio of 30 parts of dry wood pulp to 70 parts by weight of dry synthetic pulp. After the blending 0.5% by weight of aluminium sulphate of total dry weight of fibres was added for improved retention of surfactant.

This furnish was then made up into a paper web on a Fourdrinier machine, and subsequently treated, as described in Example 23.

EXAMPLE 34

The process as described in Example 33 was modified to replace the Ferlosa C$_2$KS synthetic pulp by a synthetic polypropylene pulp, the fibrils of which are filled with 16% by weight of barium sulphate, and named Carifil from Shell.

We claim:
1. A battery separator made from a paper web formed from a furnish containing a pulp mixture of which between 60 and 80% by dry weight comprises a synthetic polypropylene wood pulp with a barium sulphate filler, and of which the balance of said pulp mixture is a bleached sulphate natural wood pulp, said furnish also containing polyester staple fibres at a level of between 5 and 20% by dry weight of said pulp mixture; and said web having a phenol ethoxylate wetting agent incorporated therein whereby said web has improved electrical resistance, even after accelereted ageing, so that the electrical resistance of said web after immersion for 20 minutes in battery acid is no more than 300 m.ohms cm$^2$, and the wetting agent is retained in said web to such an extent that after accelerated ageing the electrical resistance of said web after immersion for 20 minutes in battery acid is no greater than 300 m.ohms cm$^2$.

* * * * *